(12) United States Patent
Norcott et al.

(10) Patent No.: US 6,775,518 B2
(45) Date of Patent: Aug. 10, 2004

(54) INTERACTIVE EDUCATION SYSTEM

(75) Inventors: Alfred A. Norcott, Vienna, VA (US); Aleksandar S. Manov, Peoria, IL (US)

(73) Assignee: SVI Systems, Inc., Peoria, IL (US)

( * ) Notice: Subject to any disclaimer, the term of this patent is extended or adjusted under 35 U.S.C. 154(b) by 241 days.

(21) Appl. No.: 10/056,872

(22) Filed: Jan. 25, 2002

(65) Prior Publication Data

US 2003/0143517 A1 Jul. 31, 2003

(51) Int. Cl.$^7$ .................................................. G09B 3/00
(52) U.S. Cl. ........................ 434/350; 434/118; 434/362
(58) Field of Search ............................... 434/118, 169, 434/201, 307 R, 308, 322, 323, 336, 350, 362, 365, 219, 270; 705/14; 709/203; 345/733

(56) References Cited

U.S. PATENT DOCUMENTS

| | | | | |
|---|---|---|---|---|
| 5,318,450 A | * | 6/1994 | Carver | 434/336 |
| 5,385,475 A | * | 1/1995 | Sudman et al. | 434/307 R |
| 5,727,950 A | * | 3/1998 | Cook et al. | 434/350 |
| 5,833,468 A | * | 11/1998 | Guy et al. | 434/350 |
| 5,907,831 A | * | 5/1999 | Lotvin et al. | 705/14 |
| 6,024,577 A | * | 2/2000 | Wadahama et al. | 434/322 |
| 6,086,381 A | * | 7/2000 | Downs et al. | 434/322 |
| 6,164,974 A | * | 12/2000 | Carlile et al. | 434/322 |
| 6,282,404 B1 | * | 8/2001 | Linton | 434/350 |
| 6,325,631 B1 | * | 12/2001 | Kouba et al. | 434/219 |
| 6,353,447 B1 | * | 3/2002 | Truluck et al. | 345/733 |
| 6,526,257 B2 | * | 2/2003 | Doi et al. | 434/350 |
| 6,595,781 B2 | * | 7/2003 | Sutton | 434/276 |
| 2002/0187463 A1 | * | 12/2002 | Aspe et al. | 434/362 |
| 2003/0110215 A1 | * | 6/2003 | Joao | 709/203 |
| 2003/0134260 A1 | * | 7/2003 | Hartman et al. | 434/350 |
| 2003/0207245 A1 | * | 11/2003 | Parker | 434/350 |

* cited by examiner

Primary Examiner—Joe H. Cheng
(74) Attorney, Agent, or Firm—Banner & Witcoff, Ltd.

(57) ABSTRACT

An interactive educational system simultaneously provides educational materials to multiple users. The educational system tests and records each user's demonstrated comprehension of the materials provided. The server-based system can provide materials that are data, video data, or audio data. The user may input video, audio or other data. Each user can randomly access the precise location of the educational materials or portion thereof to be presented to the user.

25 Claims, 2 Drawing Sheets

INTERACTIVE EDUCATION SYSTEM

FIELD OF THE INVENTION

The present invention relates generally to an interactive education system. In particular, the present invention relates to an interactive education system which may include a library of multimedia and interactive programming materials randomly accessed by multiple sites simultaneously and over different types of communication channels.

BACKGROUND OF THE INVENTION

Education systems which do not require a classroom teacher or instructor are well-known. For example, one type of such an education system involves the use of videotape for presenting educational information over television monitors to multiple locations. Many drawbacks exist, however, with respect to the use of such videotape technology as an educational tool. For instance, students cannot interact with a video tape presentation. In addition, videotape viewed over a communications channel and played from a remote site to multiple, simultaneous students or users cannot be randomly accessed by individual students. Other problems with videotape systems include the lack of immediate feedback to the user. In other words, videotape systems cannot provide a means to test the user and provide instantaneous feedback or provide response-dependent reinforcement of the subject material. Videotape systems also suffer from the requirement that, to be sent over certain communications channels such as Local Area Networks (LANs), the videotape signal must first be converted to a digital signal. The present invention is directed at overcoming these known drawbacks with videotape education systems.

BRIEF SUMMARY OF THE INVENTION

The present invention is generally directed to a multi-functional digital video and multimedia presentation system, incorporating components which output video, modulated radio frequency channels, and data. The system of the invention may be controlled through telephony access, over a computer network using a web based graphical user interface, or via a wireless link using handheld devices. The system may be networked to a cable television distribution system, computer local area or wide area network, and via coaxial, fiber optic or wireless connections. The system outputs may be a variety of displays, including video monitors, television sets or computer displays. The system inputs may be standardized files, video, and audio delivered over the same types of communications channels used for presentation, or analog signals received directly from other sources.

In an exemplary embodiment, an interactive educational system comprises a server including permanent memory, a first communications channel, and a terminal for a student to receive educational materials. The materials may include data, video, and/or audio presented materials. The communications channel is bi-directional whereby the server communicates with the terminal, and the user interacts with the terminal to communicate with the server. The terminal may be a computer with a processor, a monitor, and a user controlled input device, such as a keyboard, a pointing device, a camera, or a microphone. In the exemplary embodiment, the first communications channel may be an Internet communications channel.

In accordance with the exemplary embodiment, the interactive educational system may further include multiple user terminals each of which provide random access to the educational materials. The educational materials are stored by the server, and each of the multiple users may access the precise location for materials which the particular user desires to use or be presented. The server prompts each of the separate users to demonstrate their comprehension of the educational materials used by that user or student, and the server evaluates the correctness of each user's responses and re-presents relevant portions of the educational materials to that user when that user fails to demonstrate adequate comprehension of the educational materials. In the exemplary embodiment, the server includes writeable/rewriteable memory, wherein each of the users'responses are recorded in the writeable/rewriteable memory.

BRIEF DESCRIPTION OF THE DRAWINGS

The invention will be described in relation to the accompanying drawings. In the drawings, the following figures have the following general nature.

Corresponding reference numerals will be used throughout the several figures of the drawings.

DETAILED DESCRIPTION OF THE INVENTION

Figure 1:
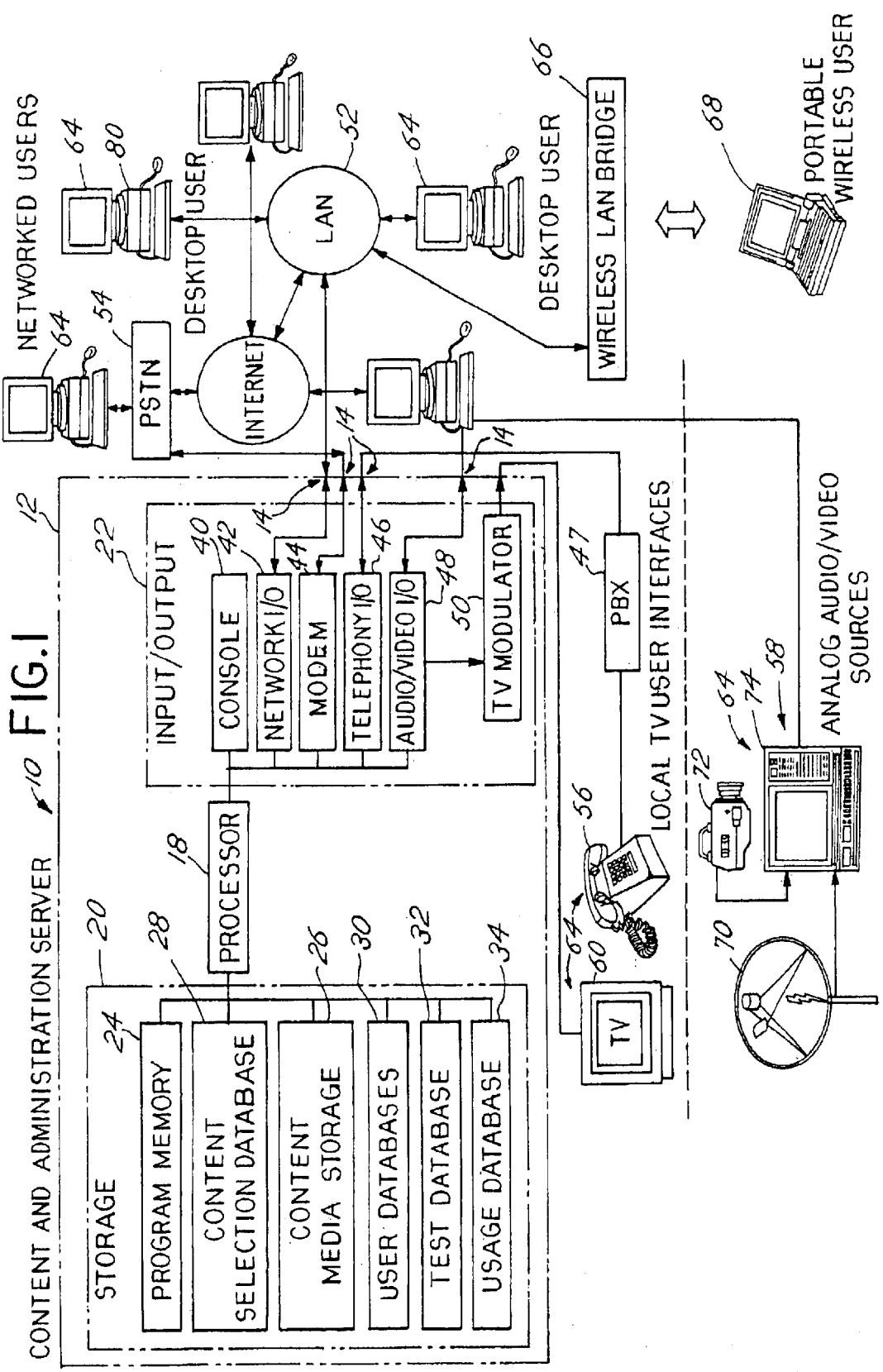
FIG. 1 is a representation schematic view of an educational system of the present invention.

Referring now to FIG. 1, an exemplary educational system 10 for providing educational materials of the present invention is depicted and includes a remotely located central operations unit, such as a computer server 12 having a plurality of communication channels 14 connected thereto. The server 12 includes a server processor 18, storage 20, and input/output 22.

While many known servers 12 may be used with the present invention, the server 12 should be capable of storing, accessing, and distributing computer applications, data, video, and audio. The server 12 should also be capable of handling multiple terminals associated with multiple, simultaneous users for the same set of educational materials, or portions thereof, as well as different sets of educational materials. The server 12 stores or accesses educational materials that may include digital computer records, programs, and/or applications, to a user located at a user terminal 64. A user thus accesses the server 12 by means of a user terminal 64, which communicates through at least one communications channel 14. As used herein, the user terminal 64 is defined as one or more components that either singly or together provide both input and output with the server 12. Therefore, the user terminal 64 may be a computer 68 which can both receive and transmit data or commands to the server 12 over a single communications channel 14, or the user terminal 64 may be a telephone 56 and one or more other devices whereby the telephone 56 allows the user to provide touchtone responses or input commands to the server 12 by means of a single communications channel 14 and whereby the one or more other devices communicate via a second communications channel 14.

The storage 20 includes a program memory 24, a content media storage 26, a content selection database 28, a user database 30, a test database 32, and a usage database 34. Other databases (not shown) may be added to the storage sector of the system 10 in order to store further information, and to enhance the capabilities of the system 10. Some databases may be eliminated or consolidated with the storage 20 of the system 10 and still be within the scope of the described invention. It should be noted that the storage 20, as well as the processor 18, utilize in various manners a permanent memory (commonly termed "ROM"), a temporary memory (known as RAM), and a writeable/re-writeable memory, as is readily known to one skilled in the art. The processor 18 may direct the accessing of the materials stored in the ROM databases, and the materials are then stored in the RAM. As is known in the art, the ROM may be a hard disk, a floppy disk, a CD-ROM, or other permanent digital recording means, as are known in the field of the art.

The program memory 24 stores programs of educational materials, and accesses the content media storage 26 and content selection database 28 for data relevant to the programs of educational materials in program memory 24. The user database 30 identifies and recognizes permitted users of the system 10, and categorizes available programs available to the user, as well as options available to the user at various times during a session. The test database 32 provides testing materials at various points in a session to a user to reinforce the materials. The results of such testing are stored as identified with the user in the usage database 34. In the case where the server 12 includes a writeable/re-writeable memory, as the user reads an instruction and responds to queries, the writeable/re-writeable memory records in the user database 30 the instruction a particular user has been presented and the results of the testing.

The usage database 34 recognizes and stores certain parameters and information regarding the access and use by users, including test responses. In some instances, it will be desirable for the system 10 to record not only objective data input from the user, such as answers to questions presented, but also video and audio responses of the user. For example, it may be desired to observe the physical behavior of how a user interacts with the system. In this case, the terminal 64 should include a camera 72 and a microphone (not shown) both of which will provide a signal output that is sent over the communications channel 14. In the case where a personal computer 80 or laptop computer 68 are employed, a computer controlled digital camera (not shown) may be employed. It will be understood by those skilled in the art that it is also possible to convert an analog output signal into a digital signal as an intermediary step prior to transmission to the server. It will be further understood that a digital signal will be received by a network interface 42 of the system 10 while an analog signal will be received by an AV I/O 48 of the system 10, both discussed herebelow.

The input/output 22 includes a console 40, a network input/output (I/O) 42, a modem 44, a telephony input/output (I/O) 46, an audio/video input/output (AV I/O) 48, and a Television (TV) modulator 50. As used herein, input/output (I/O) is a bi-directional communication over one or more paths where the "input" aspect is considered upstream, that is, from the user to the system, and where the "output" aspect is considered downstream, that is, from the system to the user. Any path is a computer data channel when the communication over that path is at least in part to or from a computer or microprocessor.

The console 40 is an input/output device or interface for use by a locally located server or system administrator. The console 40 may also provide interaction between the system 10 and a system administrator, for instance, to allow for the capture, or collection, of content to be stored in storage 20. The same function of capturing content to be stored in storage 20 may also be performed from a remote location by connecting to the system 10.

The network I/O 42 connects to area networks, such as a Local Area Network (LAN) 52 or Wide Area Network (not shown). The modem 44 connects to a phone line, such as a Public Switching Telephone Network (PSTN) 54.

The telephony I/O 46 connects to a signaling system such as a Private Branch exchange (PBX) 47 which in turn connects to a telephonic user interface, such as a telephone 56. In utilizing a telephone 56, a standard PCI computer accessory card (not shown) as part of the telephony I/O 46 provides voice prompts and interprets touchtone responses from the user via the telephone 56.

The AV I/O 48 may connect to an audio and/or video source 58, and/or to the TV modulator 50 which, in turn, connects to an end user's television set, represented as 60. It should be noted that, in the preferred embodiment, a plurality of TV modulators 50 are provided, each TV modulator 50 serving a separate simultaneous end user's television set 60. The audio and/or video sources 58 may include a satellite communications video downlink 70, a television signal camera 72, and a television receiver/demodulator and/or video tape player 74. Multi-channel PCI computer digital video decoder cards (not shown) as part of the AV I/O 48 are installed to provide analog audio and video to radio frequency television and video monitors, such as represented by 60.

The system 10 in its preferred embodiment has bi-directional communication to allow a direct exchange between a user and the server 12, and the bi-directional communication may be performed in a variety of methods and configurations. The communications channel 14 may be any channel capable of transmitting a signal from a server 12 to a remotely located terminal 64. Thus, the communications channel 14 may be a coaxial cable, a fiber optic line, a dedicated Internet line (such as ISDN or T1), a telephone line capable of transmitting modem or voice signals, a wireless, cellular, or other RF channel, or any other communications channel capable of carrying signals, depending on the required usage as discussed above and below. The server 12 transmits the proper educational materials to the terminal 64 via the communications channel 14, and the user controls the presentation of the educational materials with the appropriate input device.

It is of little consequence if a user terminal 64 connects to a PSTN 54 and then directly to the server 12 via the modem 44, or if the user terminal 64 connects from the PSTN 54 to the internet 62 and then to a LAN 52 before accessing the server 12 via the network I/O 42, or connects via a myriad of other routes that may be devised.

In the case where communications are being used over the PSTN 54, the PSTN 54 may further connect to the Internet 62 or to a terminal 64 of a user (not shown). There are multiple paths between various user terminals 64 and the server 12, for example, through the PSTN 54, the Internet 62, and the LAN 52.

In the case where communications are being made over the LAN 52, the LAN 52 may connect directly to a networked user terminal 64, to a wireless LAN bridge 66, or to the internet 62. The LAN bridge 66 is used to connect to a wireless user terminal, depicted as a wireless laptop computer 68, though other devices may be used.

In the case of a wireless communications channel, the terminal 64 may be a wireless telephone or handheld device, such as a Personal Data Assistant (PDA) or organizer, as well as a traditional computer 68 utilizing a wireless connection through a wireless LAN bridge 66, for instance. The terminal 64 may be a personal computer 80, which includes a processor, monitor, and input device, such as a keyboard or pointing device.

The user terminal 64 may also be a video monitor, represented by 60, coupled with telephone 56, a television set, also represented by 60, a wireless telephone (not shown) coupled with a video monitor 60, or PDA or organizer (not shown).

The user terminal 64 may be a computer terminal, such as a personal computer 80 or laptop computer 68, providing network access to the server 12. This may be accomplished via the modem 44 or the network I/O 42, the path for which has been described above. When interacting via personal computer 80 or laptop computer 68, software (not shown) is present in the terminal 64. The software may be a browser such as Microsoft Internet Explorer, or Netscape Navigator, or one of the many other available browser interfaces for the display of world wide web pages. In addition, executable proprietary software (not shown) that is downloadable or available on diskette or CD-Rom may be provided that connects to the internet 62 without the need for a browser. A browser is the preferred method, as it is most generally available on personal computers 80, 68 without further programming. The server 12 is programmed to accommodate standardized interfaces which are supported by common operating systems such as Windows NT or Windows 2000, both products of the Microsoft Corporation. The server 12 includes a web site application (not shown) located either in storage 20 or in the processor 18, the application running continuously with available web pages (not shown) linked in a sequence analogous to a presentation provided over the telephony I/O 46 and AV I/O 48 interfaces. Playback of materials is accomplished using standard file formats and protocols installed on the server 12.

In some instances, it may be desirable to include a smart interface (not shown) to the terminals 64, particularly those incorporating a television 60 or television receiver/demodulator and/or video tape player 74, providing for infrared television remote control (not shown) or wireless keyboard (not shown) communications. A cable television modem (not shown) or other two-way radio frequency cable may be used to accomplish the communication.

In the case where a television 60 or television receiver/demodulator and/or video tape player 74 are employed, the system 10 is ideally utilized such that the broadcast to the television 60 or television receiver/demodulator and/or video tape player 74 are closed circuit or radio frequency to a nearby television 60 or television receiver/demodulator and/or video tape player 74.

As demonstrated, the system 10 provides for a user to access the system 10 and the educational materials from a variety of terminals 64. Utilizing the various databases 24, 26, 28, 30, 32, and 34 of the storage 20 of the server 12, the system 10 provides random access to each of the multiple, simultaneous users regardless of the terminal 64 being used by the users.

Figure 2:
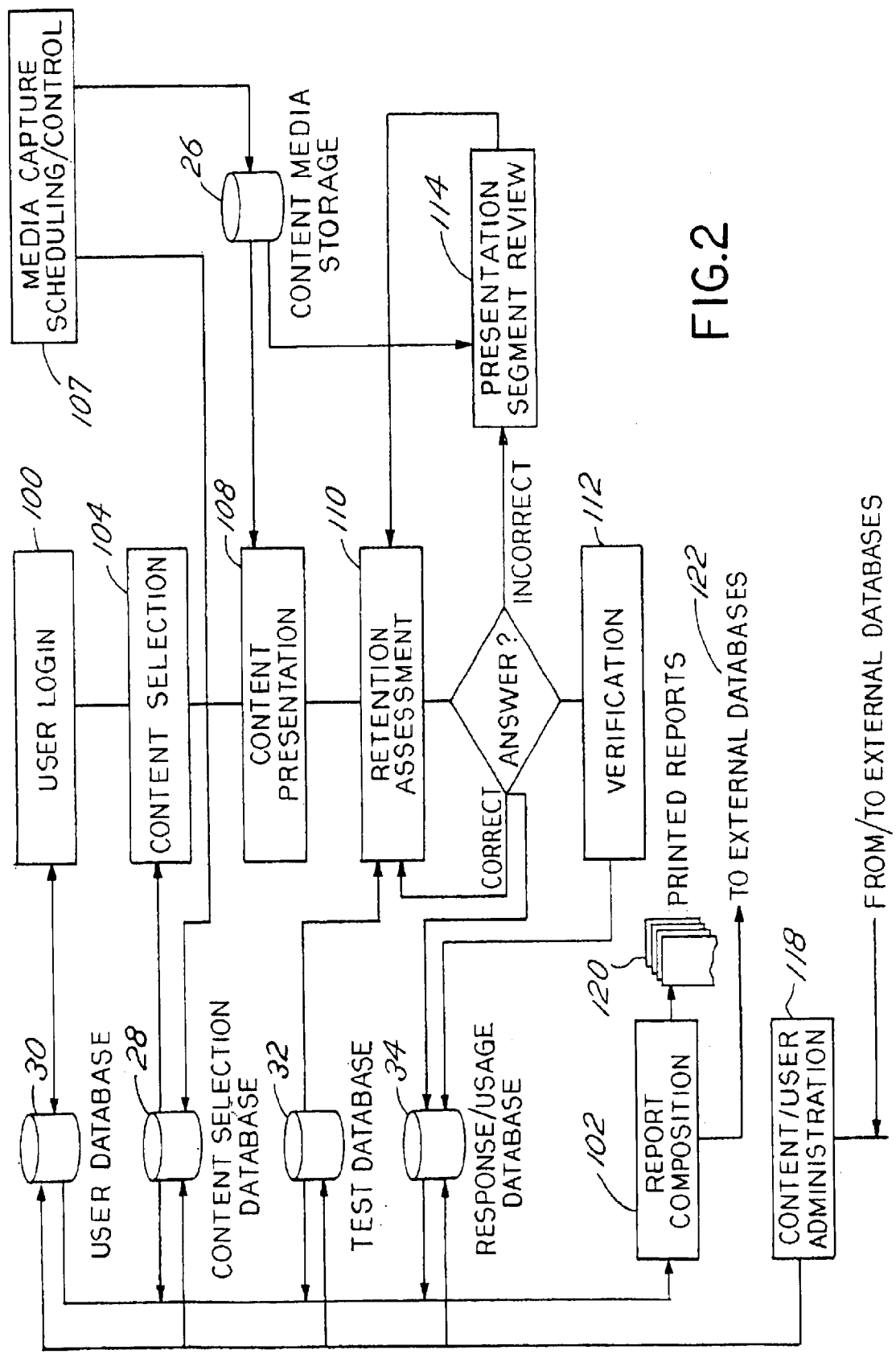
FIG. 2 is a flowchart representing features and process of the educational system of the present invention.

Referring now to FIG. 2, basic usage of the system 10 is depicted. A user is prompted to login via the terminal 64 or interface with the system 10, as at 100. When a user accesses the system 10, the system 10 verifies the identification of the users and/or location. The user database 30 determines whether the user is permitted access to the system 10 and provides an indication to a report composer 102 that will record and display a record of the materials covered as well as any test results (discussed below). The user is then prompted to select an option or make a content selection, as at 104, based upon desired program or selection (see above), by a content selection database 28, which may be located within one of the other previously discussed databases or a separate database, or the system 10 may default to a particular set or program of materials. The content selection database 28 communicates to the user database 30 to insure that access is permitted to the desired content and to determine what selections are made available to the user for content selection 104. The materials are then accessed from the content media storage 26 database to communicate and present the content, as at content presentation 108, for user viewing. The server 12 provides the materials over the communications channel 14 to the appropriate terminal 64 or interface. The materials may be in the form of digital video or audio and present questions regarding the subject matter of the materials. Programs may be paused or stopped, and the system 10 allows the user to return to the program at the exact stopping point in the future. The system 10 presents selections including options for content or interactivity such as video programming, interactive presentations, opinion survey, a test based upon previously viewed material, or the resumption of a previously selected program.

The system 10 then, in its preferred embodiment, proceeds to a retention assessment 110, or test. The focus of the interaction between the user and the materials provided by the server is that the user must demonstrate knowledge and understanding of the materials. At various points in the instruction, questions may be posed to the user to ensure longer-term retention of the material previously displayed. The system 10 accesses and communicates with the test database 32, the test database 32 providing the questions to be presented and communicating with the user database 30 in order to tailor the questions for the specific user. The materials or program may present questions that require a short answer, true/false, or multiple-choice response. The response of the user to each question presented is evaluated, by a verification 112, and recorded by the usage database 34 (response/usage database). If the question was answered correctly, the retention assessment 110 provides the next question to be answered or the program may continue with providing instruction. If the question was answered incorrectly, a presentation segment review 114 is activated, whereupon the content media storage 26 and content selection database 28 are prompted to represent the materials (content) that are relevant to the incorrectly answered question. The system 10 then re-presents the incorrectly responded to question and provides the user the opportunity to make a correct response. Once the correct response is attained, the system 10 continues through the questions in the test database 32 for that particular user and program. All interaction with the databases 28, 30, 32, and 34 are recorded in the report composition 102, as well as directed to a content/user administration 118.

All information sent to report composition 102 may be accessible by standard means and any type of report may be generated regarding users, performance, content or other desired report parameters. The report may be constructed and exported on demand to a local or network printer (not shown), or sent over compatible file format over a network for further analysis. In the case of the user being presented with an opinion survey, responses to the survey may be flagged or otherwise noted, for instance, in the case of a strong negative. The flagged responses may generate an alert transmitted over telephone, facsimile, or network communications (such as electronic mail (email)) for immediate action. The report composition 102 may provide printed reports 120, or may download to external databases, as at 122.

Administration may be conducted over the network connections, either proximally or distally (remotely) located from the system 10. This provides an administrator of the system 10 to alter, delete, or add content, selection or display structure or content, presentation, media content (materials) identification, authorization/de-authorization of users, and other operations. Access controls (not shown) are provided to prevent unauthorized tampering with the system 10. In the preferred embodiment, the system 10 includes a system administration program, such as a media capture scheduling/control program 107, that permits the addition and deletion of content (typically digital video and audio files, but also text or other types of files as are available as materials on the system 10). Ideally, the system 10 permits the input of materials (programming) that is not digital or is transferred via data networks, and, accordingly, the system 10 includes analog capture capability and permits scheduled digitization and recording to file of analog audio and video source material.

In an exemplary method, the user accesses the system 10 via a user terminal 64 comprising a telephone 56 and a monitor television 60. The telephone 56 communicates with the telephony I/O 46 which provides input/output to the storage 20 databases through the processor 18. After verifying the identification of the users and/or location, the system 10 directs the user to tune the monitor television 60 to a specific channel, dedicated to that session. The user is prompted to confirm the channel selection, whereupon an introductory screen is presented on the television 60. The introductory screen presents a set of options or selections to the user, as discussed above. After a selection is made by the user, the system 10 may present the educational materials, test the user based on the educational materials, record the user's responses, create a report of the user's activity, or act according to any of the other available options.

It will be recognized that the illustrated embodiments can be modified in arrangement and detail without departing from the scope of the present invention. Therefore, to particularly point out and distinctly claim the subject matter regarded as the invention, the following claims conclude the specification.

What is claimed is:

1. An interactive educational system for providing educational materials to multiple, simultaneous users, the system comprising:
   a central operations including a processor, a storage, and an input/output including a console for providing interaction between the system and an administrator, wherein the interaction including capture of content to be stored in the storage, a network I/O, a modem, telephony I/O, an audio/video I/O;
   a plurality of terminals for multiple users to receive the educational materials wherein at least one of said terminals include:
      a telephonic user interface for upstream control; and
      a video channel for downstream presentation of said educational materials; and
   a plurality of bi-directional communications channels whereby the central operations communicates with each of the plurality of terminals through the plurality of communications channels, wherein the multiple users interact with the terminals to communicate with the central operations, wherein the central operations provides the multiple, simultaneous users random access to the educational materials, and wherein at least one of the bi-directional communications channels includes a telephony channel in an upstream direction and a video channel in a downstream direction.

2. The system of claim 1 wherein the central operations is a computer server.

3. The system of claim 1 wherein the system allows multiple users to access simultaneously the precise location of the materials which each of the multiple users desires to be presented.

4. The system of claim 1 wherein said input/output includes a telephonic user interface, a video decoding application, and an internet server for utilizing world wide web pages, wherein at least one of the terminals includes a computer and a browser for viewing world wide web pages.

5. The system of claim 1 wherein said storage includes program storage and content storage.

6. The system of claim 1 further including interaction between the system and a remotely located administrator, the interaction including capture of content to be stored in the storage.

7. The system of claim 1 wherein at least one of the communications channels includes a computer data channel.

8. An interactive educational system for presenting to multiple, simultaneous users educational materials, the system comprising:
   a central operations including:
      a processor;
      a storage including a program memory, a content media storage, a test database,
      and a usage database;
      and an input/output including a console for providing interaction between the system and an administrator, wherein the interaction including capture of content to be stored in the storage,
   wherein the central operations provides the multiple, simultaneous users random access to the educational materials;
   a plurality of terminals for multiple users to receive the educational materials; and
   a plurality of bi-directional communications channels whereby the central operations communicates with each of the plurality of terminals through the plurality of communications channels, and wherein the multiple users interact with the terminals to communicate with the central operations.

9. The system of claim 8 further including interaction between the system and a remotely located administrator, the interaction including capture of content to be stored in the storage.

10. The system of claim 8 wherein said storage is remotely accessible, communicates with said terminals, provides information downstream to said terminals, and records information upstream from said terminals.

11. The system of claim 10 wherein said information provided downstream includes educational media content selection and testing material related to said educational materials.

12. The system of claim 8 wherein the educational materials are stored in the content media storage, wherein the users are tested on the educational materials by presenting test questions, wherein the test questions and correct responses are stored in the test database, and wherein answers to the test questions provided by the users are stored in the usage database.

13. The system of claim 12 wherein the test questions correspond to the educational materials.

14. The system of claim 13 wherein the central operations evaluates the correctness of a user's responses, wherein, in the event the user answers the test question correctly, the system presents another test question until a prescribed course of questions has been presented, and wherein, in the event the user answers the test question incorrectly, the system re-presents relevant portion of the educational materials to the user.

15. The system of claim 14 wherein the central operations stores information locating the relevant portion of the educational materials on which the user is being tested.

16. The system of claim 14 wherein the central operations includes a report composition wherein reports of the interaction by a user or users with the system may be downloaded to an external database or to a printer.

17. The system of claim 14 wherein the user is automatically re-presented with the relevant test materials, an automatically re-presented with the question until the correct answer is provided by the user.

18. The system of claim 12 wherein said educational materials comprise audio, video, text, and/or data.

19. The system of claim 12 wherein said interaction is communicated over the communications channels as web pages, text documents, audio files, video files, or standard computer files.

20. The system of claim 12 wherein said interaction is communicated over the communications channels as wireless signals, RF frequency signals, infrared signals, satellite links, digital signals, or analog signals.

21. The system of claim 8 further including a content selection database containing information about what materials are stored in the content media storage.

22. An interactive educational system for presenting to multiple, simultaneous users educational materials and testing the users on the educational materials, the system comprising:

a central operations including:
    a processor;
    a storage;
    an input/output including a console for providing interaction between the system and an administrator, wherein the interaction including capture of content to be stored in the storage, a network I/O, a modem, a telephony I/O, an audio/video I/O, wherein the network I/O communicates with a network, the modem communicates with a public switching telephone network, the telephony I/O communicates with a private branch exchange which in turn communicates with a telephonic user interface, and the audio/video I/O communicates with analog audio/video sources and/or a TV modulator which in turn communicates with a monitor; and a plurality of terminals for multiple users to receive the educational materials, wherein the terminals include one or more of the following:
    a telephonic user interface, and a television or monitor, and a computer terminal; and
    a plurality of bi-directional communications channels whereby the central operations communicates with each of the plurality of terminals through the plurality of communications channels, and wherein the multiple users interact with the terminals to communicate with the central operations.

23. The system of claim 22 including a user database wherein the users login into the system, and wherein the system verifies the identity or location of the users, and the permission of the users access the system.

24. The system of claim 23 wherein the users login into the system via one of the following:

a private branch exchange;

a computer network, herein the computer network is a local area network or world area network;

a public switching telephone network; and an internet connection.

25. The system of 24 wherein the computer network includes a wireless connection, and wherein the users login into the system via a wireless device.

* * * * *